(12) United States Patent
Hewel (10) Patent No.: US 7,295,832 B2
(45) Date of Patent: Nov. 13, 2007

(54) AUTHORIZATION MEANS SECURITY MODULE TERMINAL SYSTEM

(75) Inventor: Karl-Harald Hewel, Aichach (DE)

(73) Assignee: Infineon Technologies AG (DE)

( * ) Notice: Subject to any disclaimer, the term of this patent is extended or adjusted under 35 U.S.C. 154(b) by 283 days.

(21) Appl. No.: 10/992,467

(22) Filed: Nov. 18, 2004

(65) Prior Publication Data

US 2005/0103839 A1    May 19, 2005

Related U.S. Application Data

(63) Continuation of application No. PCT/EP03/05640, filed on May 28, 2003.

(30) Foreign Application Priority Data

May 31, 2002  (DE) ................................ 102 24 209

(51) Int. Cl.
  *H04M 1/66* (2006.01)
  *H04M 1/68* (2006.01)
  *H04M 3/16* (2006.01)
(52) U.S. Cl. .................. 455/411; 455/410; 455/426.1; 455/435.1
(58) Field of Classification Search ............ 455/411, 455/410, 426.1, 435.1, 423, 434; 235/379, 235/380, 381; 340/568.1, 568.7
See application file for complete search history.

(56) References Cited

U.S. PATENT DOCUMENTS

| | | | |
|---|---|---|---|
| 5,757,918 A | | 5/1998 | Hopkins |
| 5,825,005 A | * | 10/1998 | Behnke ................. 235/380 |
| 6,119,096 A | | 9/2000 | Mann et al. |
| 6,191,690 B1 | * | 2/2001 | Mukogawa ............ 340/568.7 |
| 6,327,677 B1 | * | 12/2001 | Garg et al. .................. 714/37 |
| 6,334,575 B1 | * | 1/2002 | Su-Hui ..................... 235/492 |
| 2001/0042049 A1 | * | 11/2001 | Zucker et al. ............... 705/55 |
| 2002/0025062 A1 | | 2/2002 | Black |
| 2002/0167919 A1 | * | 11/2002 | Marples et al. ............ 370/328 |
| 2003/0051144 A1 | * | 3/2003 | Williams .................. 713/178 |
| 2003/0106931 A1 | * | 6/2003 | Wu et al. .................. 235/375 |
| 2003/0141372 A1 | * | 7/2003 | Brown et al. ............. 235/487 |

FOREIGN PATENT DOCUMENTS

| | | |
|---|---|---|
| DE | 40 15 482 C1 | 7/1991 |
| DE | 44 09 645 A1 | 9/1995 |

(Continued)

*Primary Examiner*—Joseph Feild
*Assistant Examiner*—Huy D Nguyen
(74) *Attorney, Agent, or Firm*—Dickstein, Shapiro, LLP.

(57) ABSTRACT

An identification information transmission pathway is separated from a system side to be performed by a mobile authorization means of an owner of a security module in a wireless way. To this end, the security module comprises two interfaces, i.e. one for a communication with a terminal and a further one for wirelessly communicating with the mobile authorization means. The mobile authorization means supplies identification information to the security module for an authentication examination at its part, either stored in the authorization means in a memory or otherwise generated there, like e.g. via biometric sensors, via a keyboard or the like. The security module, performing the examination of the identification information, like e.g. preferably via a zero knowledge method or a zero knowledge protocol, respectively, only then indicates a request for an action at the terminal, like e.g. of a money transfer, when the examination is successful.

13 Claims, 7 Drawing Sheets

FOREIGN PATENT DOCUMENTS

| | | |
|---|---|---|
| DE | 197 19 275 C2 | 11/1998 |
| DE | 198 12 469 A1 | 9/1999 |
| DE | 199 09 916 A1 | 9/2000 |
| DE | 199 14 506 A1 | 10/2000 |
| DE | 199 29 251 C2 | 12/2000 |
| DE | 100 43 499 A1 | 3/2002 |
| DE | 100 50 298 A1 | 4/2002 |
| EP | 0 379 333 A1 | 7/1990 |
| JP | 64-024038 A1 | 1/1989 |
| JP | 04-306760 A1 | 10/1992 |
| JP | 10-21469 A1 | 1/1998 |
| JP | 11-15936 A1 | 1/1999 |
| JP | 11-262061 A1 | 9/1999 |
| JP | 2000-259786 A1 | 9/2000 |
| WO | WO-98/45818 A2 | 10/1998 |
| WO | WO-00/51008 A1 | 8/2000 |

\* cited by examiner

100 # AUTHORIZATION MEANS SECURITY MODULE TERMINAL SYSTEM

CROSS-REFERENCE TO RELATED APPLICATION

This application is a continuation of copending International Application No. PCT/EP03/05640, filed May 28, 2003, which designated the United States, and was not published in English and is incorporated herein by reference in its entirety.

BACKGROUND OF THE INVENTION

1. Field of the Invention

The present invention generally relates to security module terminal systems, like e.g. in the field of credit cards, debit cards, value cards and money cards. In particular, the present invention relates to an improvement of the security against the use of lost or stolen cards by unauthorized persons.

2. Description of Prior Art

In currently used security module terminal systems the authorized users of the system are represented by a security module which functions as a cryptographic unit or a cryptounit, respectively, and is typically a chip card. A cryptounit is usually suitable to store cryptographic keys securely against unallowed access and to perform cryptographic algorithms using this key. The algorithms are generally used for data which are provided by the security module terminal system, for example, for authenticating the cryptounit within the scope of a challenge/response method or for generating a digital signature.

Figure 10:
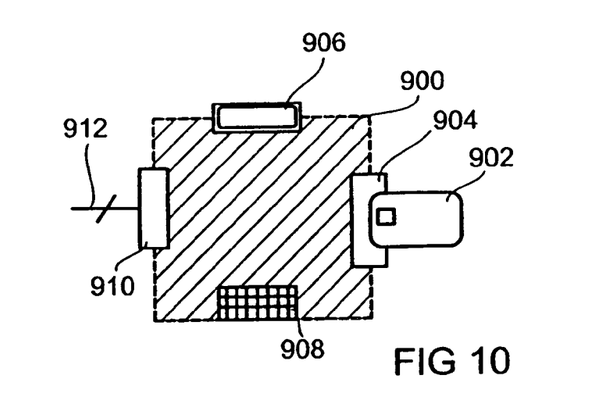
FIG. 10 shows a schematical illustration of a terminal and a security module of a conventional security module terminal system.

A particular problem with these systems is to exclude the use of the cryptounits or the security modules without the explicit will of the authorized user of the system and therefore the improper use or the use of the same by unauthorized persons, respectively. In the past, for this a preceding identification of the owner at the terminal was required to be able to differentiate the authorized user from an unauthorized user. FIG. 10 shows the typical components which are usually used in connection with such chip card systems. In particular, FIG. 10 schematically shows a terminal 900 and a security module 902 which is inserted into a contacting unit 904 of the terminal 900. Apart from the contacting unit 904, the terminal 900 comprises an output unit 906, an input unit 908 and an interface 910 for a connection via a network 912 for example to a central computer of the system, like e.g. of a bank.

Figure 11:
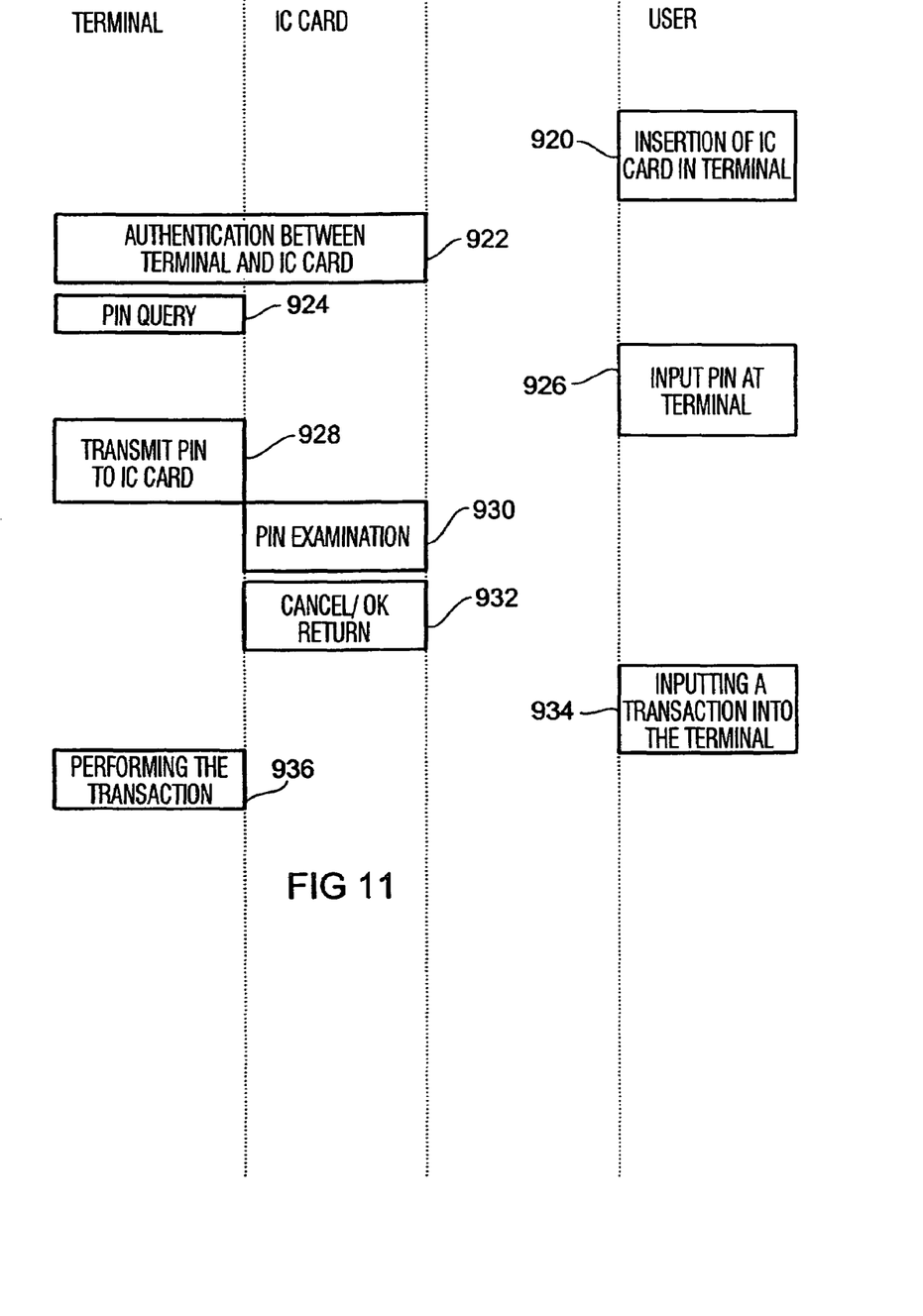
FIG. 11 shows a schematical diagram illustrating the main steps in the conventional proceeding for an identification of the user in front of the background of the IC card terminal system of FIG. 10.

In FIG. 11 the method of a terminal transaction between the components of FIG. 10 is illustrated schematically, as it usually took place to determine the identification of the current card owner. In FIG. 11 the individual steps during a transaction process are illustrated in blocks, which are arranged in chronological order from top to bottom. In addition, FIG. 11 is arranged in three columns, wherein each of the same, as it is indicated at the top of each column, is associated with the terminal, the IC card or the user, respectively. Each block is arranged horizontally in the column or the columns, respectively, which is either associated with the terminal, the IC card or the user, respectively, depending on the fact who is actively participating in the respective step.

After the user has inserted the cryptounit 902, of which it is assumed in the following that it is an IC card, into the interface 904 of the terminal 900 provided therefore in step 920, as it is illustrated in FIG. 10, in step 922 first of all an authentication between the terminal 900 of the system on the one hand and the IC card 902 of the user on the other hand is performed which only serves for the fact that the terminal 900 and the IC card 902 mutually identify themselves as approved communication partners. In order to determine the identification of the current owner of the IC card 902, the terminal 900 prompts the user of the IC card 902 via the output unit 906 in step 924 to enter an identification parameter, like e.g. a PIN or a personal identification number, respectively. In step 926 the owner enters the PIN which is secret and usually only known to the authorized user via the input unit 908 of the terminal 900. Within the terminal 900 the input PIN is passed to the IC card 902 via the interface 904 in step 928. In a following step 930 the IC card 902 checks whether the PIN was entered correctly. Depending on the correctness of the input either a canceling of the transaction at the terminal 900 is performed in step 932 or the IC card 902 confirms the correct input of the PIN to the terminal 900, whereupon the user is given the opportunity in step 934 via the input unit 908 to determine the transaction to be performed more precisely. In step 936 the terminal finally performs the transaction.

Although the misuse of the IC card 902 by an unauthorized user seems to be banned, as the knowledge of the PIN required for performing a transaction lies solely with the authorized user, different problems results with the above-illustrated proceedings. First of all, the authorized user needs to memorize the PIN apart from a plurality of other secret numbers, passwords and similar things, which is troublesome and brings the danger that the user forgets the PIN or notes the PIN somewhere to avoid this, where it may be discovered by a criminal person. In order to address this problem, in the past the use of biometric features of the authorized user as identification parameters was proposed, like e.g. of a fingerprint or a face detection or similar things.

Although the problem of the having-to-memorize of the card user is overcome by biometric features, the necessity for the user further remains, to perform an input which may be more or less troublesome, depending on the identification parameter or the biometric feature, respectively. The input is, however, urgently required, as otherwise the identification of the current card owner may not be performed or it may not be determined whether the current card owner is the authorized card owner. With applications in which the desire for a comfortable handling overweighs the protection from unauthorized use, no PIN entries from the user-side are required, like for example with telephone cards.

A security system for a protection from criminal misuse of security modules is missing, which is tailored to applications which on the one hand require more security than it is possible without an identification check of the card owner, and for which on the other hand the effort for the user should be low, like for example with monthly or yearly tickets for checking the authentication to drive in local traffic. It is therefore a disadvantage of the traditional approach for avoiding the unallowed use of security modules by a third party using a PIN, that the increase of the security needs to be paid for by the fact that the paying process is elongated substantially by the integrated user authentication or the input of the PIN, respectively.

One main problem with the above-described method for avoiding the criminal misuse of IC cards is, that independent of the used identification parameters, i.e. also with the use of biometric features, that the card owner is forced to input the personal identification parameter which is only known to him in a strange environment and to confide it to the "system". In the insecure environment the card owner may not be able to enter his PIN without being exposed to the observation by third parties, like e.g. by supervisory cameras or similar things, through which third parties may get to know the PIN. In addition, with the above-described proceedings (step 926 of FIG. 11), the card owner inevitably has to reveal his identification parameter at the terminal 900 and therefore to the system. With highly trusted terminal means, like e.g. automated teller machines (bancomat), the revealing of the identification parameter seems to be no concern, however, although in the past also here automated teller machine dummies have been used to put on a seemingly real terminal for card owners to obtain the PIN of the card owner. The card owner should however feel more unease to present the identification parameter to a criminal third party in the area of cashless payments, like e.g. at POS terminals (point of sales terminals) for payment applications. The card owner inevitably has to trust the confidential handling of his identification parameter input in the POS-terminals.

It is noted hereby that as soon as a criminal third party gets to know the identification parameter of the authorized user the same may perform any performable transactions with the IC card of the authorized user as soon as he gets hold of the IC card, that is in the name of the authorized user. As these two components finally identify the authorized user of the system with all his rights in the system, therefore a very high protection demand against the above-described misuse of the security module arises.

To meet this deficit of a possible misuse of the identification parameters, in the past a cost- and time-consuming technology was used to verify the misuse via costly evaluations. To achieve an acceptance of their systems, the manufacturers of the security module terminal systems need to guarantee, that the used terminals are protected from attacks and that in the case of a PIN being an identification parameter the input unit 908, the output unit 906 and the contacting unit 906 are secured against spying out and manipulation, which again causes high costs.

Examples of security module terminal systems of the above kind with or without the input of an identification parameter at the respective terminal position are disclosed in the following documents.

JP10240368 describes a computer system which uses a contactless portable card in order to test whether a user is authorized by the computer system receiving the identification information from the card via a communication circuit provided within the peripherals.

A similar system is disclosed in DE4015482, which relates to an authentication system for a data processing terminal, which queries an identification plate ported by a user, like e.g. at a bracelet.

A system with biometric identification parameters is described in JP10021469, which relates to a cash desk device for a contactless IC card for the use in a supermarket. The cash desk device receives information via a communication unit from a memory on the IC card via the eye of the user and compares the same with a registration of the card owner.

JP11015936 describes an information processing system for the public telephone which is based on a data transaction between a contactless prepaid IC card and an IC card reader.

WO200051008-A1 describes a hybrid IC chip and a method for an authentication of another participant at which a data conversion from physical features into identification-based data is performed.

JP2000259786 refers to an authentication device for a contactless enter/leave room administration system in buildings, wherein an ID code in a data carrier is compared to a pre-stored code and to read out codes for judging the authentication.

DE19909916-A1 relates to a method and a device for raising park fees. Each parking space is provided with a communication device comprising an input device, a control device, an output device and an interface for identification cards, which may be plugged into the communication device. The communication devices serve as terminals for an automatic transfer of all required information for raising parking fees to a control device.

DE19719275-C2 relates to a system with a portable terminal, comprising two receptables for producing an operative connection to a data carrier inserted into the same and controls, indicators and a control circuit. In the system uniquely associated data carriers exist, wherein some functions which may be performed by the terminal may only be performed when the data carriers currently inserted into the terminal are associated with each other. Checking this state is performed in microprocessors of the two data carriers via a mutual communication connection via the two receptables of the terminal.

SUMMARY OF THE INVENTION

It is an object of the present invention to provide a new security concept for security module terminal systems, which increases the security.

In accordance with a first aspect, the invention provides a mobile authorizer for an authorizer security module terminal system having a terminal, the authorizer, and a security module, which is a chip card, the authorizer having: a provider for providing identification information; and an interface for wirelessly communicating with the security module, wherein the mobile authorizer is physically separated from the security module and the terminal, the provider having: an input device for inputting information by a user upon a query request from the security module; and an encryptor for performing an encryption based on information inputted to receive the identification information.

In accordance with a second aspect, the invention provides a system having: a terminal; a security module, the security module being a chip card; and a mobile authorizer; the mobile authorizer having: a provider for providing identification information; and an interface for wirelessly communicating with the security module, the security module having: an interface for communicating with the terminal; an interface for wirelessly communicating with the mobile authorizer; an examiner for examining the identification information of the mobile authorizer; and a requester for requesting an action at the terminal, wherein the requester for requesting an action is controllable to perform a request depending on whether the examination is successful, the terminal having: an interface for communicating with the security module; and a processor for performing the action upon the request from the security module, wherein the terminal, the security module and the mobile authorizer are physically separated from each other, the provider having: an input device for inputting information by a user upon a query request from the security module; and an encryptor for performing an encryption based on the information inputted to receive the identification information.

In accordance with a third aspect, the invention provides a method for an authentication in view of a security module of an authorizer security module terminal system having the security module, a terminal, and a mobile authorizer, the security module being a chip card, the method including the following steps: inputting information at the authorizer which is physically separated from the security module and the terminal, by a user upon a query request from the security module; performing an encryption based on information inputted, to obtain identification information, in the authorizer; and wirelessly communicating the identification information from the authorizer to the security module.

In accordance with a fourth aspect, the invention provides a method for performing an action in an authorizer security module terminal system having a terminal, a security module and a mobile authorizer, physically separated from each other, the security module being a chip card, the method including the following steps: inputting information at the authorizer by a user upon a query request from the security module; performing an encryption based on information inputted, to obtain identification information, in the authorizer; wirelessly communicating the identification information from the mobile authorizer to the security module; examining the identification information of the mobile authorizer in the security module; requesting an action at a terminal by the security module depending on whether the examination is successful; and performing the action upon the request from the security module.

The present invention is based on the findings that the current proceedings, to input the identification information into an insecure environment which is strange to the security module owner using an input unit of the terminal and to supply the identification information to the security module via the interface between the terminal and the security module, need to be discarded. According to the invention, the identification information transfer path is therefore removed from the system side to take place from a mobile authorization means of the user to the security module in a wireless way. For this, the security module comprises two interfaces according to the invention, i.e. one for a communication with the terminal and a further one for a wireless communication with the mobile authorization means. The mobile authorization means provides identification information to the security module for an authorization or an authentication test, respectively, which are either stored in a store in the authorization means or generated another way, like e.g. via biometric sensors, via a keyboard or the like. The security module which performs the examination of the identification information, like e.g. preferably via a zero knowledge method or a zero knowledge protocol, respectively, only sends a request of an action at the terminal, like e.g. of a money transfer, when the examination was successful. In other words, the security module only takes over the role of the owner in the system when it is in connection with the mobile authorization means and the latter has verified its authenticity using the identification information, like e.g. a mutually known secret.

Due to the fact that according to the invention the functionality, i.e. the request of an action at the terminal, is made dependent on the fact, whether the correct identification information is provided to the same by the mobile authorization means, an identification information query via the terminal or via a bypass via the system, respectively, is not required. The identification information of the user therefore remain in his private area and do not have to be confided to a strange environment in the form of the terminal or the "system", respectively, as it was usual in the past.

As with former systems without an identification examination of the security module user it is not inevitable necessary that the terminal is equipped with an input unit and an output unit. In contrast to such former systems without an identification examination of the security module owner, however, an identification examination is performed in spite of it via the second interface of the security module and via the contactless transmission to the mobile authorization means, according to the invention. An unauthorized person who is in possession of the security module but not of the mobile authorization means of the authorized or approved owner, respectively, may not cause actions at the terminal with the security module alone, as the security module lacks the identification information of the mobile authorization means. The additional effort which the security module owner is exposed to for the increase in security is only that he himself needs to carry a mobile authorization means for the use of the security module which may for this purpose, however, for example be integrated in a fob watch, a mobile telephone or glasses of the owner in a comfortable way, which he carries with him anyway. Compared to former PIN input systems, consequently the price of an elongated transaction time needs not to be paid for the increased security. The transaction time, like e.g. at point of sales locations, is consequently decreased compared to systems which require a PIN input.

For high-security applications, in which also the possibility that a criminal third party obtains the possession of both the security module and of the mobile authorization means are to be considered, the mobile authorization means may comprise an input unit instead of a memory, in which the identification-relevant information is stored, like e.g. a keyboard or a sensor, for detecting biometric characteristics, like e.g. a loudspeaker for voice-recognition, an optical mapping system for face-recognition, a writing field for handwriting recognition, an optical scanner for fingerprint recognition or the like. The input of an identification parameter by the card owner is in this case in contrast to known systems, however, performed in a secure environment and the identification information to be transferred to the security module do in this case not go the indirect way via a third party or a system component, respectively, like e.g. the terminal.

An important advantage of the present invention regarding an introduction of the inventive security concept in an existing infrastructure is, that inventive security modules may also be used with terminals in which the examination of identification information or identification parameters, respectively, is performed on the security module side by the user stating any dummy PIN to the terminal which is only acknowledged by the security module if the suitable authorization means is present.

BRIEF DESCRIPTION OF THE DRAWINGS

In the following, preferred embodiments of the present invention are explained in more detail referring to the accompanying drawings, in which.

DESCRIPTION OF PREFERRED EMBODIMENTS

Before the present invention is explained in more detail in the following referring to the drawings, it is noted that elements which are the same or have the same function are designated with the same or similar reference numerals and that a repeated description of these elements is avoided to avoid repetitions.

Figure 1:
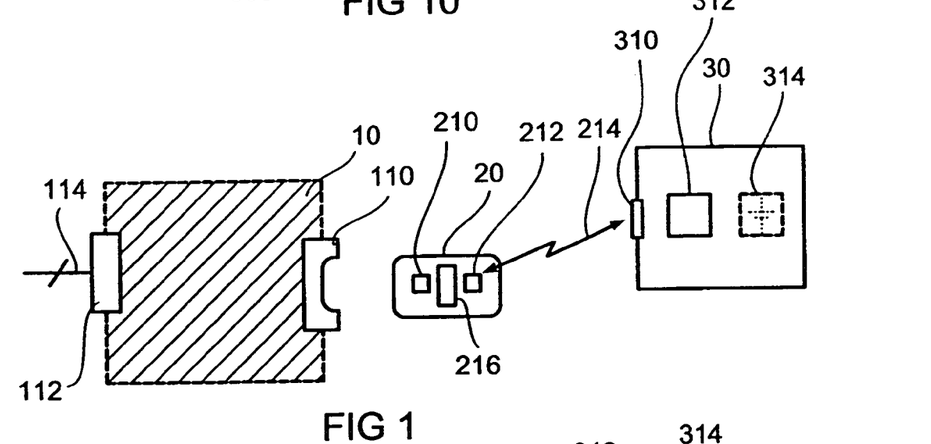
FIG. 1 shows a schematical illustration of a terminal, a security module and a mobile authorization means according to an embodiment of the present invention.

Referring to FIG. 1, in the following an embodiment of the present invention is described, in which the mobile authorization means or identification and authorization unit, respectively, which is in the following shortly referred to as IAE, does not comprise an input unit for the input of identification parameters by the user, but in which the information necessary for the identification information is stored in a memory.

FIG. 1 shows a terminal 10, a security module 20 in the form of an IC card and the IAE 30. The illustrated components 10, 20 and 30 are part of an IAE security module terminal system, like e.g. of a system for a secure cashless payment or a system for raising ride fees in public local traffic. Terminal 10 for example belongs to a bank or a traffic organization. The IC card 20 has for example been issued by the terminal operator, i.e. e.g. by the bank or the traffic organization, or is a multiple-application card, which is useable with several security module terminal systems. Also the IAE 30 may either have been issued by the terminal operator for a special use with the security modules of this operator or may be useable with a plurality of different security modules for different card systems. The security module 20 and the IAE 30 have been issued to an authorized user and are personally associated with the same. The IC card 20 either acknowledges several IAEs, like e.g. the IAEs of authorized users, or is uniquely associated with one special IAE. Both items, IC card 20 and IAE 30, are carried by the user. The IAE 30 may hereby for example be integrated in a watch, glasses or a mobile telephone of the user and be implemented in one single integrated circuit.

The terminal 10 includes an interface 110 for a communication with the IC card 20 which may be implemented as a contact or a contactless interface, as well as interface an 112 for a communication of the terminal 10 via a bus system 114 with a central point (not shown) of the IAE chip card terminal system. The security module includes a first interface 210 for a communication with the terminal 10 and is accordingly implemented with the interface 110 of the terminal 10 either as a contactless or a contact interface. Further, the security module 20 includes a second interface 212 for a wireless communication 214 with the IAE 30. Finally, the security module 20 further includes a processing unit 216 for controlling the functioning of the security module 20, as it is described in the following.

Apart from a contactless interface 310 for a wireless communication 214 with the security module 20 the IAE 30 further includes a memory 312 in which information associated with the IAE 30 and the security module 20 of the user are stored from which identification information may be derived or which corresponds to the same, like e.g. a PIN of the user of the IAE 30 and the IC card 20. The IAE 30 may further comprise an energy source 314, like e.g. a battery, an accumulator, a photocell or the like. As it is illustrated by the dashed illustration of the energy source 314 in FIG. 1, this energy force may, however, also be missing when the security module 20 is implemented, as it is discussed in more detail in the following, to contactlessly supply the IAE 30 with electromagnetic energy during a terminal session.

The IAE 30 may for example be integrated in a fob watch, glasses or a cellular telephone of the authorized user or is implemented as a self-contained device. Alternatively, the device may consist of a combination of an IC card and an above-mentioned device, comprising the capability for a wireless communication.

Figure 2:
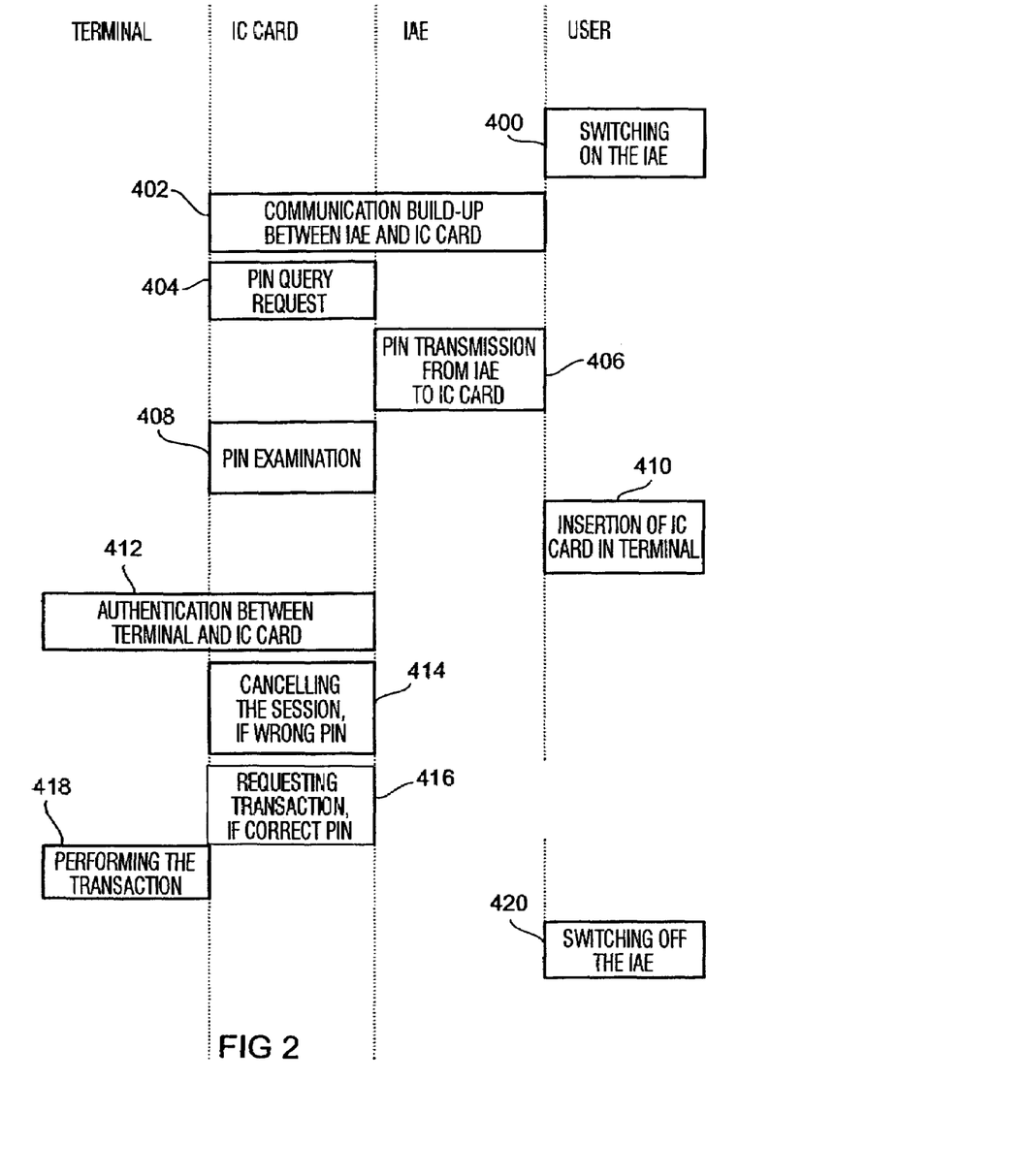
FIG. 2 shows a schematical diagram illustrating the main steps of a situation in which a security module user requests an action at the terminal in front of the background of the embodiment of FIG. 1.

After the construction of the individual components of the IAE IC card terminal system has been described above referring to FIG. 1, in the following the functioning of the same is described referring to FIG. 2 using a situation in which the IC card owner wants to perform an action at the terminal 10, like e.g. a debit from a centrally run account or the attainment of an access authorization to a room to which only authorized persons have access. In the description of FIG. 2 reference is further made to FIG. 1. Further, referring to FIG. 2 it is assumed, for example, that the IAE 30 has its own energy source 314.

The illustration in FIG. 2 corresponds to the same of FIG. 11. Consequently, the individual steps during the transaction are illustrated in blocks, which are arranged vertically in a chronological order from top to bottom and horizontally in columns which are associated with the terminal 10, the IC card 20, the IAE 30 or the user, respectively, to indicate, which step is performed by whom.

In one step 400 the user is directly positioned in front of the terminal 10 and switches on the IAE 30 for example by pushing a button or the like, whereupon the IAE 30 tries to build up the wireless communication 214 with the IC card 20 via its interface 310 in step 410. In step 404 consequently a query request from the security module 20 to the IAE 30 is performed, with which the IC card 20 requests the identification information from the IAE 30, wherein it is assumed only exemplary and for a better understanding that the identification information is a PIN. Upon the PIN query request the IAE 30 reads out the PIN from the memory 312 in step 406 and transmits the same to the IC card 20. In step 408 the security module 20 or the control unit 216, respectively, performs an examination of the PIN transmitted by the IAE 30, like e.g. by a comparison with a predetermined PIN stored in the IC card 20.

The steps 406 and 408 provided for the examination of the identification information stored in the memory 312 are of course performed preferably in connection with cryptologic methods. In addition, the examination may comprise more steps than it was described. Additionally, the examination may be performed on both sides, for a dual-sided authentication, like e.g. for an exchange of a secret, like e.g. of the identification parameter itself. In particular, the PIN transmission in step 406 may for example be performed in an encrypted way in which the examination in step 408 is performed by the comparison to a predetermined PIN stored in an encrypted way. Preferably, however, a zero knowledge method or protocol, respectively, is performed, as in this protocol in step 406 a data exchange defined by the respective zero knowledge protocol is put in the position of the above-described transmission of a PIN as an identification parameter, wherein the actual identification parameters in the IAE 30 are neither transmitted to the IC card 20 in an encrypted way nor in plaintext, but the IAE 30 uses the stored identification information to encrypt suitably selected or randomly selected numbers from the IC card 20 and send the result back to the IC card 20. The IC card may exclude based on the answers of the IAE 30 in the course of the zero knowledge protocol at least to a certain degree, that its communication parameter at the interface 212 is not an IAE 30 which is associated with the authorized user. The advantage of the use of the zero knowledge protocol is consequently, that the actual identification information do not have to be transmitted and that therefore a tapping of the dialog is prevented.

Referring to FIG. 2 again it is noted that it is assumed that the PIN examination is repeated iteratively after the steps 406 and 408, for example every second, wherein this is not illustrated in FIG. 2 for reasons of clarity. The user, who switched on the IAE 30 in step 400 and who notes nothing about the communication build-up 402 and the PIN examination after the steps 406 and 408, leads the IC card 20 into the terminal 10 or into the interface 110 provided for the same in step 410. A subsequent mutual authentication occurring in step 412 between the terminal 10 and the IC card 20 guarantees for both communication partners that the terminal 10 or the IC card 20, respectively, are approved systems components.

Already before a request of a transaction at the terminal, the IC card 20 examines the PIN received by the IAE 30 in step 414 and cancels the terminal session if the examination is without success or yields, respectively, that the PIN is wrong. If, however, the PIN is correct, the IC card 20 requests the execution of a transaction from the terminal 10 in step 416. The request of step 416 may be that the IC card does not correctly perform the authentication in step 414 or does not perform another fixed step in a communication protocol between the IC card 20 and the terminal 10, like e.g. the communication build-up itself, so that in other words the activation of the coupling to the terminal does not take place at all, if the right identification parameter has not been provided. Upon the request of the transaction in step 416, the terminal 10 performs the transaction, like e.g. the opening of a door, the debiting of a fixed amount from an account of the user, like e.g. when entering a subway or the like. After the execution of the transaction 418, which is for example noted to the user via a suitable audio signal or the like, the user switches off the IAE 30 again in step 420, whereupon the IC card 20 receives no more identification information and therefore does not perform a request of a transaction from a terminal according to step 416 anymore.

Referring to FIG. 2 it is noted, that an iteratively repeated PIN examination according to the steps 406 and 408 as it was described above is not necessary, but that instead for example the steps 402-408 are only performed once directly before the step 414. In this case the steps 402-408 would be initiated by the IC card 20 directly before the IC card 20 has to decide about the request of the transaction. Alternatively, the steps 402-408 could only be performed once directly after switching on the IAE, wherein after a successful PIN examination in the IC card using a timer provided within the IC card (not shown) a time period is determined up to which the IC card 20 is enabled or useable, respectively, or regards the PIN examination as successful, respectively. This way, the IC card 20 could also be used in cases in which the wireless communication 214 during the terminal session, i.e. during the time in which the IC card 20 is inserted into the terminal 10, is interrupted due to for example a closing mechanism at the interface 110.

Figure 3:
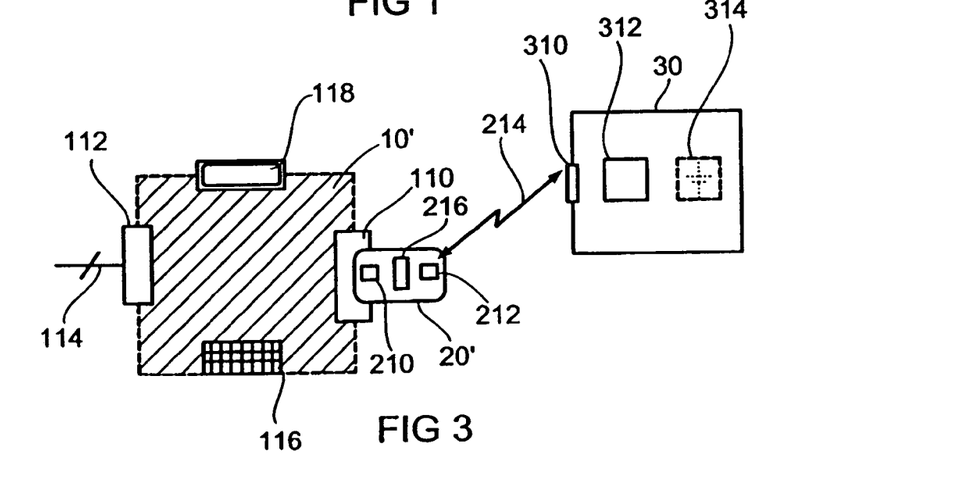
FIG. 3 shows a schematical illustration of a terminal, a security module, and a mobile authorization means according to a further embodiment.

Referring to FIG. 3, in the following an embodiment of an IAE IC card terminal system is described, in which the terminal corresponds to a conventional terminal which is actually provided for conventional IC cards of conventional IC card terminal systems and which makes the execution of a transaction dependent on the input of a PIN of the user, as in the past.

The components shown in FIG. 3 correspond to the same of FIG. 1, with the exception that the terminal 10' includes an input unit 116 and an output unit 118 in addition to the interfaces 110 and 112, and that the IC card 20' uses another protocol for a communication with the terminal 10'. Additionally, in contrast to FIG. 1, the IC card 20' is shown in a position inserted into the interface 110 of the terminal 10'.

In the following, referring to FIG. 3 and 4, the functioning of the system of FIG. 3 is described, i.e. for the case that the terminal 10' is a terminal which expects an input of a PIN by a user. The process at the terminal 10' is illustrated in the same way as in FIG. 2. In one step 500 the user first of all switches on the IAE 30, whereupon in step 502 a communication built-up between the IAE 30 and the IC card 20' is started. As it was described above referring to the steps 404, 406 and 408, after that an examination of the PIN stored in the IAE is performed in steps 504, 506 and 508, wherein steps 506 and 508 are repeated iteratively. Upon switching on the IAE 30 in step 500, the user inserts the IC card 20' into the terminal 10' in step 510, whereupon an authentication between the terminal 10' and the IC card 20' in step 512 is initiated. Like it is necessary for conventional IC cards to prevent a criminal misuse by unauthorized persons, the terminal undertakes a PIN query in step 514, in which it outputs a corresponding instruction to the user on the output unit 118. The user thereupon performs an input at the input unit 116 in step 516. In contrast to card users of conventional IC cards it is not necessary with the IC card 20' of the present system that the user memorizes a PIN, not even the one stored in the IAE. Of the latter, the user needs not even know the existence. The user rather enters a dummy PIN, i.e. a random sequence of numbers, at the input unit 116 of the terminal 10' in step 516, which the terminal passes on to the IC card 20' in step 518. From this point of time the terminal expects a PIN ok return from the IC card 20', i.e. an indication that the dummy PIN is correct. Before the IC card 20', however, indicates to the terminal 10' that the dummy PIN is correct, it replaces the examination regarding the identity of the user which is performed by the PIN entered by the user in conventional IC cards, by the iteratively repeating PIN examination according to the steps 506 and 508, corresponding to an attendance examination of the IAE 30 associated with the authorized user of the IC card 20'. If the PIN examination yields that the PIN transmitted by the IAE 30 is wrong, then the IC card cancels the terminal session in step 520. If the PIN transmitted by the IAE 30 is correct, however, and therefore the examination is successful, then the IC card 20 returns the PIN ok signal expected by the terminal 10 to the terminal 10 which corresponds to a request of a transaction in the embodiment illustrated in FIG. 2 and pretends to the terminal that the input dummy PIN authorized the user.

At the input unit 116 of the terminal 10' the user is now given the possibility to determine the transaction to be performed more clearly in step 524, like e.g. by entering an amount of money to be debited. In step 526 the terminal 10' performs the transaction input by the user. After the performed transaction the user switches off the IAE 30 in step 528, whereby the IC card 20' is not supplied with the PIN necessary for its functioning any more.

Figure 5:
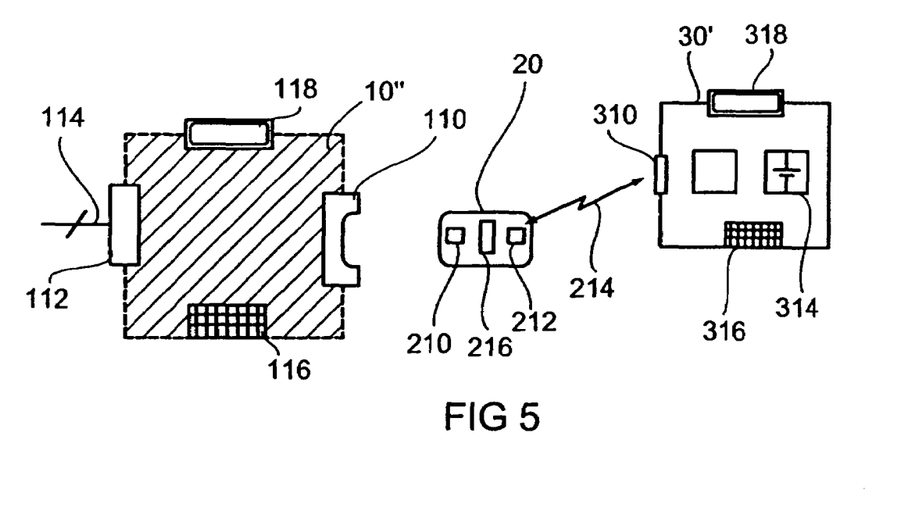
FIG. 5 shows a schematical illustration of a terminal, a security module and a mobile authorization means according to a further embodiment.

FIG. 5 shows a further embodiment of the present invention. In this embodiment the terminal differentiates from the one in FIG. 2 by the fact that the same comprises an input unit and an output unit. In contrast to the terminal of FIG. 3, the terminal 10" is, however, not implemented for conventional IC cards and it does not expect a PIN input by the user, but it is implemented for IC cards, which indicate the request of a transaction described in FIG. 2. In addition, the IAE 30' illustrated in FIG. 5 differentiates from the one of FIG. 1 and 2 by the fact that it comprises an input unit 316 and an output unit 318 instead of the memory, which are a keyboard and a display, like e.g. an LCD display in the present embodiment.

Figure 6:
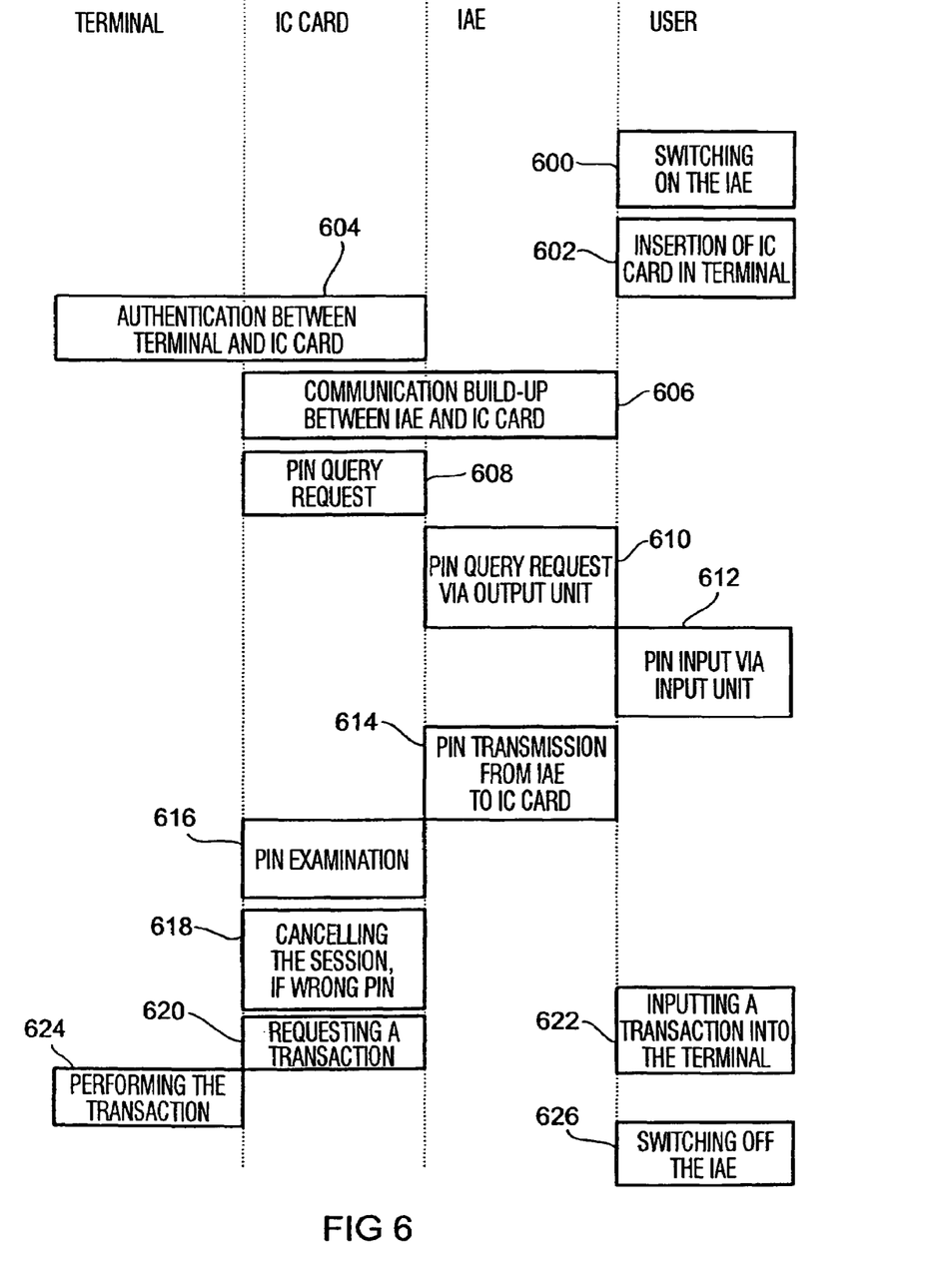
FIG. 6 shows a schematical diagram illustrating the main steps of a situation in which the security module owner requests an action at the terminal in front of the background of the embodiment of FIG. 5.

Referring to FIG. 5 and 6, in the following the functioning of the system of FIG. 5 is described during a terminal session. First of all, the user switches on the IAE 30' in step 600, when the terminal session lies ahead. Thereupon, the user inserts his IC card 20 into the terminal 10" in step 602, whereupon an authentication between the terminal 10" and the IC card 20 takes place in step 604. In the further course the terminal 10" expects a request from the IC card 20 for a transaction. Before, the IC card 20 examines a PIN to be transmitted by the IAE 30', however. In this embodiment, the IC card 20 initiates the communication with the IAE 30' at a point of time during the communication with the terminal 10", before the terminal 10" expects the request from the IC card 20. It therefore inserts a communication between the IAE 30' and the IC card 20 in step 606, which may include a mutual authentication, like e.g. a challenge response method, in order to guarantee for both communication partners, that the communication partner is an approved component of the IAE IC card terminal system. In step 608 the IC card 20 sends a PIN query request signal to the IAE 30'. Thereupon, the IAE 30' prompts the user via the output unit 318 in step 610 to input a PIN. The user therefore enters his PIN only known to him in step 610 via the input unit 316 of the IAE 30', i.e. in a familiar private environment. The IAE 30 passes the input PIN to the IC card 20 in a subsequent step 614 via the wireless communication 214 in a subsequent step 614. The IC card 20 thereupon examines the PIN in step 616 and cancels the terminal session in step 618, if the PIN is wrong. If the PIN is correct, however, the IC card 20 indicates a request for a transaction to the terminal 10" in step 620. The user is thereupon given the opportunity in step 622 to specify the transaction to be performed via the input unit 116 in more detail, like e.g. the height of the amount of money to be debited. In step 624 the terminal 10" then performs the transaction. In step 626 the user switches IAE 30' off the again.

It is one advantage of the output means at the IAE that the same may be used for a trusted output of transaction data or messages to the user.

As it became clear from the preceding three embodiments, a transmission of identification information from which the IC card makes a request for a transaction dependent, only takes place between the IAE and IC card, so that this information remains in the private area of the user and does not have to be confided to a third party and in particular not to a terminal or to the system, respectively. The control over the IC card 20 and the identification information therefore remains with the user and is not withdrawn from the same as with conventional security module terminal systems. This should again increase the acceptance of the inventive system. In addition, by the fact that the identification information to be handled privately does not go through the terminal, the infrastructure for inventive systems become cheaper, because cost and time consuming technology and possibly security evaluations for system components, like e.g. the terminal, may be omitted.

Figure 4:
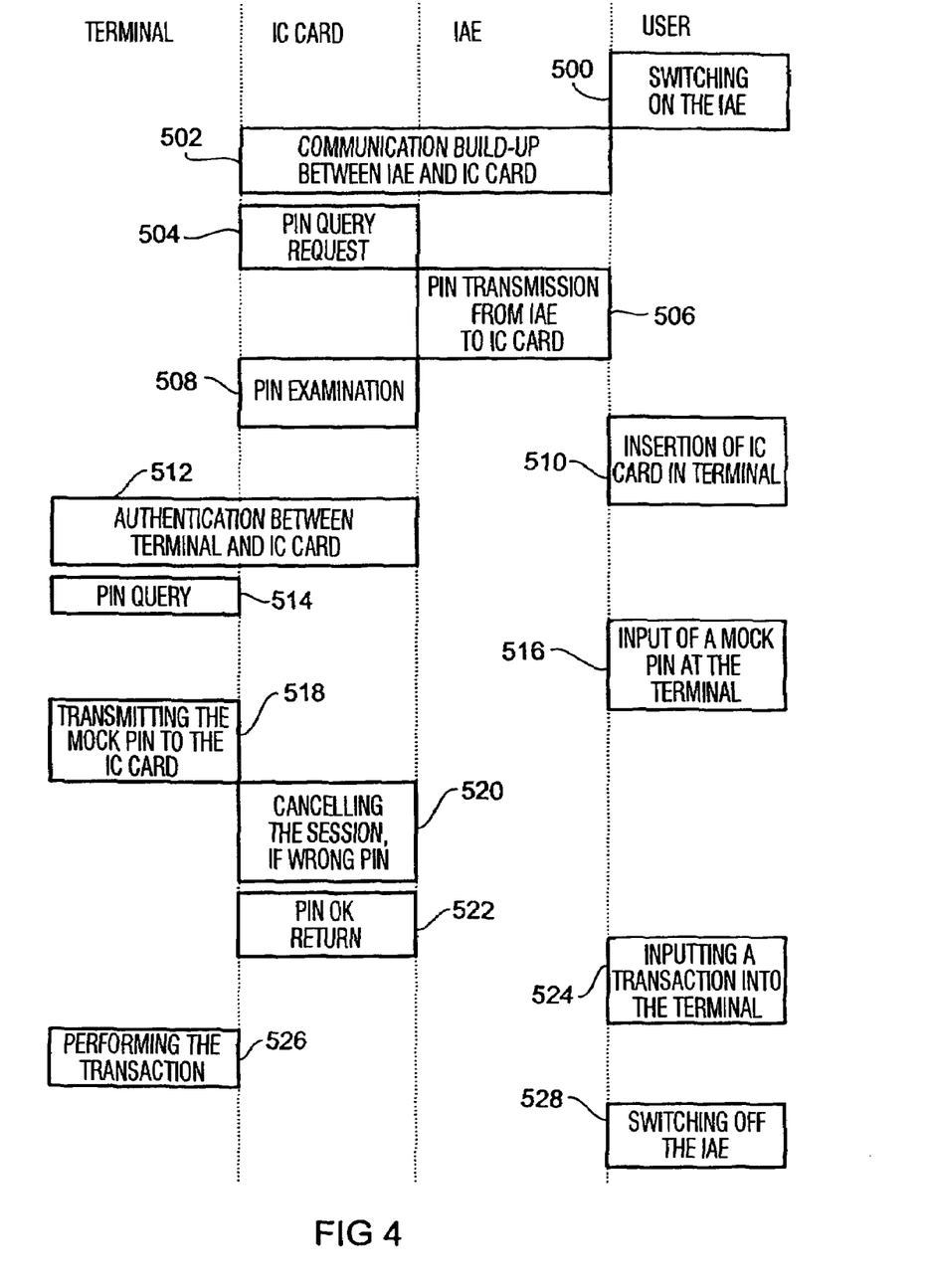
FIG. 4 shows a schematical diagram illustrating the main steps of a situation in which a security module user requests an action at the terminal in front of the background of the embodiment of FIG. 3.

In particular, the embodiment described referring to the FIGS. 3 and 4 makes clear that with a corresponding implementation of the IC card the existing infrastructure of terminals may be used. Any identification feature is presented to the terminals, which does not evaluate the IC card but discards the same, wherein the IC card thereupon makes the release of the function requested from the system dependent on the above described authorization examination.

With regard to the terminal it is noted that the terminal may be provided to perform any action depending on the request of the IC card. These actions include for example the opening of a door, a debiting of an account, the use of a public telephone or the like. Depending on the action to be performed, the embodiments described above offer possibilities to fulfill the requirements imposed on the IAE IC card terminal system regarding security on the one hand and low-effort operability on the other hand. In the embodiment of FIG. 1, for the case of an IAE without an inherent energy source, which is supplied with electromagnetic energy via the IC card, which the IC card again receives from the terminal, the wireless communication between the IAE and the IC card for example starts automatically upon the insertion of the IC card into the terminal, so that no additional operational effort is imposed on the user, as it is the case with conventional card terminal systems, in which no examination of identification parameters is performed. The security against misuse of the IC card by unauthorized persons is, however, clearly increased as an unauthorized user of the IC card may not cause an action at the terminal with the same, if he does not also hold the IAE.

For applications with higher requirements to security, the embodiment of FIG. 5 and 6 guarantees that an unauthorized third party who gets hold of the IC card and the associated IAE requires the knowledge of the secret only known to the authorized user for triggering an action at the terminal. This secret, which was described as the PIN in the preceding embodiments, may be entered by the user in his familiar environment, so that it is more difficult for the unauthorized third party to "learn" the secret.

It is noted that also a security stage different from terminal to terminal with or without an identification parameter input of the user at the IAE may be provided so that the input is not required for each use of the IC card.

With reference to the FIG. 2, 4 and 6 it is noted that it is possible to perform the authentication 412, 412, 512, 606 between terminal and IC card only after the identification of the user or the examination of the PIN by the IAE 414, 520, 618, respectively. This is advantageous in so far that no information is revealed by the IC card as long as it is not determined that the user of the IC card was recognized as the unauthorized user.

Figure 7:
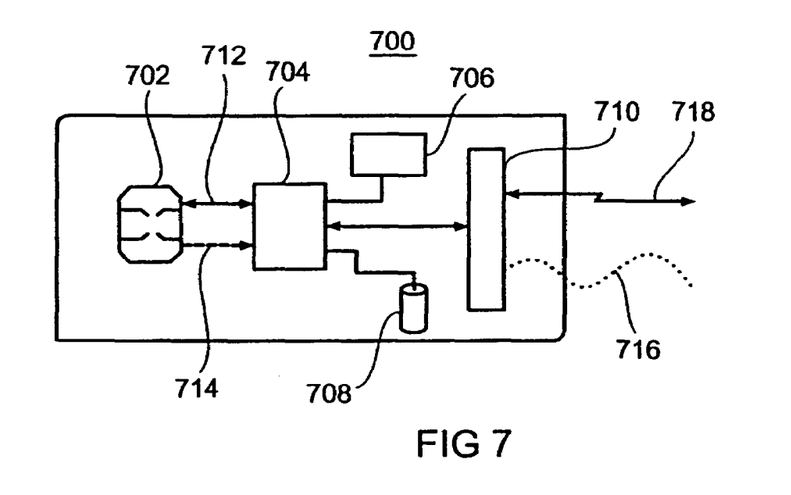
FIG. 7 shows a schematical block diagram of a security module according to the present invention.

In the following, with reference to FIG. 7, the construction of an IC card according to an embodiment of the present invention is described. The IC card of FIG. 7 generally designated by 700 includes a contact field 702, a central processing unit 704, a computer unit 706 for performing computational tasks, like e.g. an encryption/decryption, a memory 708 which contains at least also one involatile part, as well as contactless interface 710.

The contact unit 702 is provided for contacting the corresponding interface of a contact terminal and could be implemented in another embodiment to achieve a contactless coupling to a contactless terminal. The central processing unit is connected to the contact field 702 to receive data 712 via the same from the terminal and send them to the same. Further, the central processing unit 704 is connected to the computer unit 706, the memory 708 and the contactless interface 710. The operational energy for an energy supply of the computer unit 706, the central processing unit 704 and the memory 708 is either supplied via the terminal via the contact unit 702, as is indicated by a dashed arrow 714, or the same is supplied to the IC card 700 from the IAE in a contactless way in the form of electromagnetic energy, as it is indicated by a dashed wave 716. Alternatively, also a combination of the two energy supplies may be provided. Further, the contactless interface 710 may apart from a wireless communication 718 further be provided to conversely supply the IAE with energy in the form of electromagnetic energy 716, which the IC card itself receives from the terminal via the contact field 702.

The central processing unit 704 takes over the control of the IC card 700, as it was described above referring to FIG. 2, 4 and 6, following a suitable communication protocol between the terminal and the IC card or a communication protocol between IAE and IC card, respectively. In the computer unit 706 decryption/encryption tasks regarding communications and if necessary authentication with the terminal and/or the IAE and in particular regarding the examination of the identification information wirelessly transmitted from the IAE via the interface 710 are performed. In the memory 708, for example, an operating system and applications which may be run on the same are stored as well as data necessary for examining the identification information wirelessly transmitted from the IAE. In particularly simple implementations, in which the identification information from the IAE is transmitted in a form which allows a direct transmission with the data stored in the memory 708, the computer unit 706 may be missing, and only reference identification information are stored in the memory 708. In the case of an examination of the secret by a challenge-response protocol, for example a corresponding code for performing the protocol as well as an IC card key are stored in the memory 708.

Figure 8:
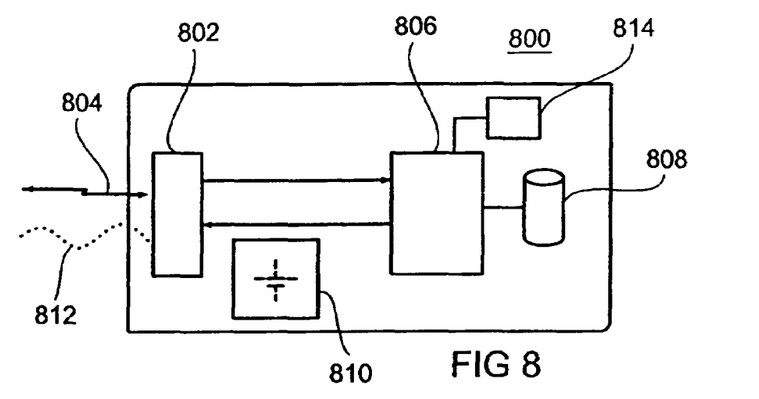
FIG. 8 shows a schematical block diagram of a mobile authorization means according to an embodiment of the present invention, in which the identification information is stored in a memory.

With reference to FIG. 8, an embodiment for an IAE is described, which comprises no input unit and no output unit. The IAE illustrated in FIG. 8, which is generally designated with 800, includes a contactless interface 802 for a wireless communication 804 with the IC card, a central processing unit 806, a memory 808 and optionally an energy source 810 for supplying the IAE 800 with the necessary operational energy, like e.g. a battery, an accumulator, a photocell or the like. Alternatively, the contactless interface 802 is implemented to generate the electrical energy necessary for operating the IAE from the electromagnetic energy 812 supplied by the IC card. In the case, that the IAE 800 has its own energy source 810, the contactless interface 802 may be provided to generate also electromagnetic energy 812 in addition to the wireless communication 804 with the IC card, to supply the IC card with the necessary operational energy, for example while the same is not located in a terminal. The central processing unit 806 is connected to the interface 802 and the memory 808. If necessary, further a computer unit 814 for performing encryption/decryption tasks is provided which is also connected to the central processing unit 806. The IAE of FIG. 8 may for example be integrated in an IC or consists of a combination of an IC with an electronic device, like e.g. a cellphone, a watch or the like.

The central processing unit 806 controls the functioning of the IAE 800 according to FIG. 2, 4 and 8 and in particular takes over tasks regarding a communication protocol between the IAE and the IC card. In the memory 810, at least comprising also an involatile part, information is stored, from which identification information to be transmitted to the IC card for an examination may at least be derived or in which the same are directly stored. Computational tasks regarding encryptions and decryptions to be performed during the communication and/or authentication with the IC card and in particular regarding the answers to the questions of the IC card according to the zero knowledge protocol, if such a protocol is used, are referred from the central processing unit 806 to the calculating unit 808.

Figure 9:
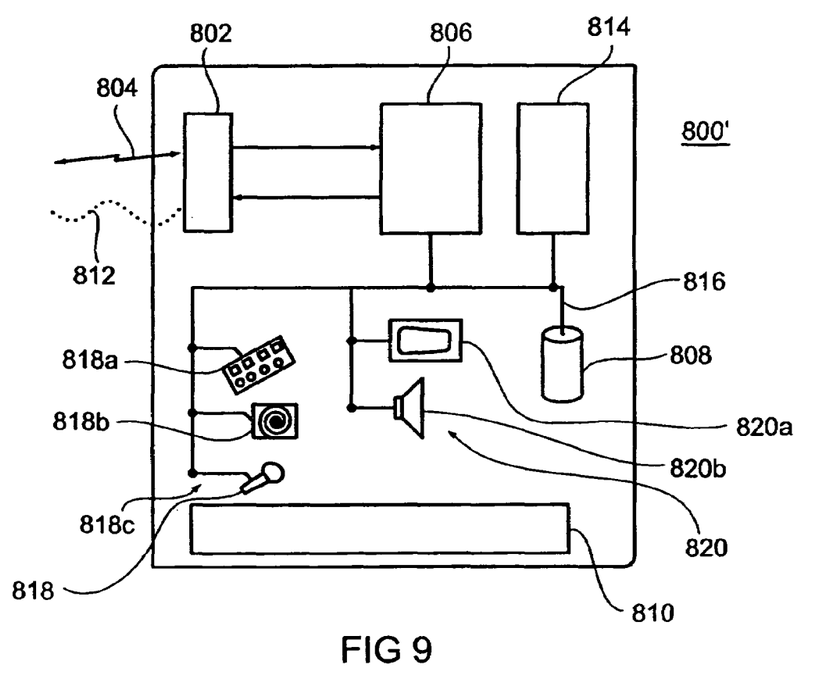
FIG. 9 shows a schematical diagram of a mobile authorization means according to an embodiment of the present invention, in which the identification information is derived from identification parameters input by the user.

In FIG. 9 an alternative embodiment to FIG. 8 for an IAE 800' is shown, which may for example be used with an embodiment of FIG. 5 and 6. The IAE 800' includes a contactless interface 802 for a wireless communication 804 with the IC card 20, a central processing unit 806 connected to the same, a memory 808 and an energy source 810, like e.g. a battery, an accumulator or a photocell. The contactless interface 802 is further suitable to supply the IC card with energy 812 contactlessly. Further, a calculating unit 814 is provided. The central processing unit 806, the calculating unit 814 and the memory 808 are connected to each other via a bus 816. Via the bus 816, further one or several input units 818 and one or several output units 820 are connected to the central processing unit 806. The input units 818 include for example a keyboard 818a, a biometric sensor 818b for detecting biometric characteristics of the user, like e.g. a fingerprint, facial features or a signature, and/or a microphone 818c for voice recognition. The output units 820 include for example an indication unit 820a, like e.g. an LCD display and/or loudspeakers 820b.

The central processing unit 806 controls the functioning of the IAE 800', as it is described in FIG. 2, 4 and 6. In particular, it takes over tasks regarding a communication protocol between the IAE and the IC card. Further, the central processing unit 806 controls the user input processes, like they were described in the embodiment of FIG. 5 and 6, and hereby outputs the requests to be output to the user via the bus 816 and the output units 820 to the user and receives the data input by the user via the input units 818 via the bus 816. In the memory 808 which at least also comprises an involatile part, for example an operating system and programs or applications, respectively, are stored. In the memory 808, however, in contrast to the preceding embodiments, no identification information or identification parameters have to be stored, as identification parameters may be input by the user via one of the input units 818. In the memory 808, however, algorithms or protocols, respectively, may be stored for a transmission of the identification information, like e.g. for processing the input identification parameters according to the zero knowledge protocol. In the case of the input of biometric features, further a program may be provided, which derives identification parameters from frame data, audio data or other biometrically detected data. The computer unit 808 is provided to perform encryption/decryption tasks regarding for example a communication and an authentication using the IC card, and in particular regarding necessary encryption/decryptions based on the identification parameters which are input by the user at the input units 812. The identification parameters input by the user via the input units may, however, alternatively be transmitted wirelessly to the IC card, without any preceding cryptological processing. As it was discussed above, for converting the identification parameters into suitable identification information, a zero knowledge protocol is preferred, as it comprises the advantage that the input identification parameters do not have to be revealed to the outside and do not have to be stored in any form within the IC card.

It is to be noted that the interface of the IC card for the terminal may further be implemented for a contactless data transmission. For this case, the two interfaces to the IAE and the terminal may be implemented as a contactless interface, which simultaneously supports the several communication connections. In addition, the invention is not restricted to the above-described IC cards as security modules. Security modules which may be used with the present invention may also comprise other forms.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A mobile authorizer for an authorizer security module terminal system, which further comprises a terminal and a security module that is a chip card, the mobile authorizer being comprised of the authorizer security module terminal system, the mobile authorizer comprising:
   a provider for providing identification information; and
   an interface for wirelessly communicating with the security module,
   wherein the mobile authorizer is physically separated from the security module and the terminal,
   the provider comprising:
   an input device for inputting information by a user upon a query request from the security module; and
   an encryptor for performing an encryption based on information inputted to receive the identification information,
   wherein the mobile authorizer is portable or the mobile authorizer is wearable by a user.

2. The mobile authorizer according to claim 1, wherein the input device for inputting information is selected from a group consisting of a keyboard and a sensor for detecting biometric characteristics.

3. The mobile authorizer according to claim 1, wherein the provider is adjusted to provide the identification information according to a zero knowledge method.

4. The mobile authorizer according to claim 1, further comprising a provider for providing operational energy for the mobile authorizer.

5. The mobile authorizer according to claim 4, wherein the provider for providing operational energy is selected from a group consisting of a battery, an accumulator, a photocell and a converter for converting electromagnetic energy from the security module into electrical energy.

6. The mobile authorizer according to claim 1, further comprising:
   a transmitter for transmitting electromagnetic energy to the security module.

7. The mobile authorizer according to claim 1, further comprising:
   an output unit for outputting output information concerning a communication between the security module and the mobile authorizer and/or a communication between the terminal and the security module.

8. The mobile authorizer according to claim 1, further comprising:
   an encryptor/decryptor for encrypting/decrypting the communication with the security module via the interface for wirelessly communicating.

9. A system, comprising:
   a terminal;
   a security module, the security module being a chip card; and
   a mobile authorizer;
   the mobile authorizer comprising:
   a provider for providing identification information; and
   an interface for wirelessly communicating with the security module;
   the security module comprising:
   an interface for communicating with the terminal;
   an interface for wirelessly communicating with the mobile authorizer;
   an examiner for examining the identification information of the mobile authorizer; and
   a requester for requesting an action at the terminal, wherein the requestor for requesting an action is controllable to perform a request depending on whether the examination is successful,
   the terminal comprising:
   an interface for communicating with the security module; and
   a processor for performing the action upon the request from the security module,
   wherein the terminal, the security module and the mobile authorizer are physically separated from each other,
   the provider comprising:
   an input device for inputting information by a user upon a query request from the security module; and
   an encryptor for performing an encryption based on the information inputted to receive the identification information.

10. The mobile authorizer according to claim 9 wherein the mobile authorizer is portable.

11. The mobile authorizer according to claim 9 wherein the mobile authorizer is wearable by a user.

12. A method for an authentication in view of a security module of an authorizer security module terminal system having the security module, a terminal, and a mobile authorizer, the security module being a chip card,
   wherein the mobile authorizer is portable or the mobile authorizer is wearable by a user, the method comprising the steps of:
   inputting information at the authorizer which is physically separated from the security module and the terminal, by a user upon a query request from the security module;
   performing an encryption based on the information inputted, to obtain identification information, in the authorizer; and
   wirelessly communicating the identification information from the authorizer to the security module.

13. A method for performing an action in an authorizer security module terminal system having a terminal, a security module, and a mobile authorizer, physically separated from each other, the security module being a chip card,
wherein the mobile authorizer is portable or the mobile authorizer is wearable by a user, the method comprising the steps of:

inputting information at the authorizer by a user upon a query request from the security module;

performing an encryption based on the information inputted, to obtain identification information, in the authorizer;

wirelessly communicating the identification information from the mobile authorizer to the security module;

examining the identification information of the mobile authorizer in the security module;

requesting an action at a terminal by the security module depending on whether the examination is successful; and performing the action upon the request from the security module.

* * * * *

UNITED STATES PATENT AND TRADEMARK OFFICE
CERTIFICATE OF CORRECTION

PATENT NO.         : 7,295,832 B2
APPLICATION NO. : 10/992467
DATED                 : November 13, 2007
INVENTOR(S)       : Karl-Harald Hewel It is certified that error appears in the above-identified patent and that said Letters Patent is hereby corrected as shown below:

At column 4, line 47, "requester" should read --requestor--

At column 4, line 49, "requester" should read --requestor--

At column 11, line 26, "FIG." should read --FIGS.--

At column 12, line 46, "FIG." should read --FIGS.--

At column 13, line 29, "FIG." should read --FIGS.--

At column 14, line 10, "FIG." should read --FIGS.--

At column 14, line 25, "FIG." should read --FIGS.--

At column 14, line 44, "FIG." should read --FIGS.--

At column 14, line 48, "FIG." should read --FIGS.--

Signed and Sealed this

Twenty-fifth Day of March, 2008

JON W. DUDAS
*Director of the United States Patent and Trademark Office*